US009242193B2

(12) United States Patent
Bryan et al.

(10) Patent No.: US 9,242,193 B2
(45) Date of Patent: Jan. 26, 2016

(54) FILTER APPARATUS AND METHOD OF USE

(75) Inventors: Deborah M. Bryan, Cheshire, CT (US); Laurence W. Bassett, Killingworth, CT (US); Paramjit Singh, Edmonton (CA)

(73) Assignee: 3M Innovative Properties Company, St. Paul, MN (US)

(*) Notice: Subject to any disclaimer, the term of this patent is extended or adjusted under 35 U.S.C. 154(b) by 860 days.

(21) Appl. No.: 13/504,161

(22) PCT Filed: Oct. 27, 2010

(86) PCT No.: PCT/US2010/054217
§ 371 (c)(1),
(2), (4) Date: Jul. 30, 2012

(87) PCT Pub. No.: WO2011/053623
PCT Pub. Date: May 5, 2011

(65) Prior Publication Data
US 2012/0279915 A1    Nov. 8, 2012

Related U.S. Application Data

(60) Provisional application No. 61/256,643, filed on Oct. 30, 2009.

(51) Int. Cl.
*B01D 29/39* (2006.01)
*B01D 29/46* (2006.01)
(Continued)

(52) U.S. Cl.
CPC .............. *B01D 29/39* (2013.01); *B01D 29/46* (2013.01); *B01D 29/96* (2013.01); *B23Q 1/25* (2013.01); *Y10T 29/49826* (2015.01)

(58) Field of Classification Search
CPC ........ B01D 25/12; B01D 25/13; B01D 25/16; B01D 25/18; B01D 25/176; B01D 25/34; B01D 25/343; B01D 33/0041; B01D 33/0048; B01D 35/30; B01D 35/306; B01D 69/00; B01D 29/39; B01D 29/96; B01D 29/00; B01D 29/46; B01D 29/965; B23Q 1/25; B23Q 1/26; Y10T 29/39826
USPC ......... 210/230, 232, 324, 330, 331, 346, 386; 248/128, 130, 133, 137, 146; 269/55, 269/58
See application file for complete search history.

(56) References Cited

U.S. PATENT DOCUMENTS 2,183,951 A * 12/1939 Anderson .................... 493/145
3,494,467 A    2/1970 Paisley
(Continued)

FOREIGN PATENT DOCUMENTS

DE    343144    10/1921
DE    30 05 310 A1    7/1981
(Continued)

OTHER PUBLICATIONS

Boston Gear, Why Use a Torque Limiter?, Mar. 22, 2006, p. 1.*
PCT International Search Report for PCT/US2010/054217, dated Apr. 4, 2011.

*Primary Examiner* — Joseph Drodge
(74) *Attorney, Agent, or Firm* — Scott A. Baum; Aleksander Medved

(57) ABSTRACT

A filter holder is disclosed comprising a base for supporting the filter holder on a work surface, a tilting mechanism attached to the base, and a holder arm attached to the tilting mechanism at a tilt axis. The holder arm comprises a base end and a distal end and is tiltable about the tilt axis to a service position and an ergonomic loading position.

15 Claims, 13 Drawing Sheets

(51) Int. Cl.
  *B01D 29/96* (2006.01)
  *B23Q 1/25* (2006.01)

(56) References Cited

U.S. PATENT DOCUMENTS

| | | | | |
|---|---|---|---|---|
| 3,928,008 | A | * 12/1975 | Petersen | ............... 55/472 |
| 7,153,425 | B2 | 12/2006 | Stankowski | |
| 2005/0011840 | A1 | 1/2005 | Stankowski | |
| 2008/0105605 | A1* | 5/2008 | Kobayashi | ............... 210/209 |
| 2011/0259812 | A1 | 10/2011 | Marks | |
| 2011/0297604 | A1 | 12/2011 | Bryan | |

FOREIGN PATENT DOCUMENTS

| | | | |
|---|---|---|---|
| DE | 3240102 | | 5/1984 |
| FR | 2822720 | | 10/2002 |
| GB | 1902083292 A | * | 0/1902 |
| JP | S60-193511 | | 10/1985 |
| JP | S63-035414 | | 3/1988 |
| JP | H10-317120 | | 7/1997 |
| JP | 2006064438 | | 3/2006 |
| JP | 2010-207719 | | 9/2010 |
| TW | 293076 | | 7/2006 |

* cited by examiner

FILTER APPARATUS AND METHOD OF USE

CROSS REFERENCE TO RELATED APPLICATIONS

This application is a national stage filing under 35 U.S.C. 371 of PCT/US2010/054217, filed Oct. 27, 2010, which claims priority to U.S. Provisional Application No. 61/256,643, filed Oct. 30, 2009, the disclosures of which are incorporated by reference in their entireties herein.

BACKGROUND

Stacked, disk-type lenticular filters have been used in processing of fluids for commercial applications. In a typical filtration system employing such filters, the filters are assembled for operation inside a sanitary housing that is sealable from an ambient environment. The sanitary housing is typically a generally cylindrical pressure vessel that has structure for fluid ingress and egress.

Under normal operation, pressurized fluid to be filtered enters the sanitary housing through the fluid ingress and fills the area surrounding the disk-type lenticular filters. The fluid is then filtered through the filter elements, after which the filtered fluid enters the stacked inner core. The stacked inner core is fluidly connected to a fluid egress, which can route the filtered fluid (filtrate) to downstream plumbing.

Such systems are often bulky, top-heavy and time consuming to assemble. In some cases, overhead lifts must be used to remove heavy parts from the stack between uses. Typically, such systems are bolted or otherwise fixed to a floor so that assembly and disassembly can be achieved without risk of tipping the system. Furthermore, such systems typically comprise several heavy and expensive metallic parts that must be cleaned and sanitized between uses. The sanitary housing, along with any other non-disposable wetted parts, must be carefully cleaned before each use. If the sanitary housing or other wetted parts are not properly cleaned, subsequent batches of fluid may be cross-contaminated. The sanitizing steps can add significant delay to processes. Often, significant quantities of sanitizing agent must be used to sanitize such parts. Consumption and disposal of such sanitizing agents can create undesirable environmental impact. Furthermore, such systems often require a skilled and trained operator for proper compression.

Moreover, such systems are typically mounted, often bolted to the floor or a skid, as a permanent fixture in a given room at a manufacturing location. Each such room typically contains several large related manufacturing fixtures with associated plumbing that may be employed, for example, in scale-up manufacturing processes. To the extent the manufacturing location has multiple such rooms, a separate permanent filtration fixture must be provided in each room.

There is a continuing need for filtration systems that are lighter and are easier to assemble. There is also a need for filtration systems that are mobile so that a single unit may be employed in multiple rooms. There is also a need for filtration systems employing materials that, when disposed of, are less expensive and more environmentally friendly. There is also a need to eliminate cross-batch contamination between runs. There is also a need for filtration systems that require less cleaning and down-time between uses. There is also a need for filtration systems that are less reliant upon operator skill in achieving satisfactory results. There is also a need for filtration systems that consume less floor space in operation.

SUMMARY OF THE INVENTION

The present disclosure relates generally to filtration systems comprising disposable filter capsules. The present disclosure further relates to a filter holder to hold and operate such disposable filter capsules. Such systems can eliminate the need for a separate sanitary housing, therefore eliminating cross-batch contamination. Such systems can be made mobile so that a single filtration system can serve multiple rooms in a manufacturing facility. Such systems can reduce or eliminate the need for sanitization between uses. Such systems can allow for easier loading and unloading of filter capsules from a filter holder. Such systems can further allow easier loading of filter capsules, while also providing a smaller footprint while the filter holder is in operation.

In one embodiment, the present disclosure provides a filter holder comprising a base for supporting the filter holder on a work surface, a tilting mechanism attached to the base, and a holder arm attached to the tilting mechanism at a tilt axis. Typically, the holder arm comprises a base end and a distal end. In some embodiments, the holder arm is tiltable about the tilt axis to a service position and an ergonomic loading position.

In some embodiments, the holder arm comprises a compression plate proximate the base end and a holding plate opposite the compression plate. In such embodiments, the compression plate may be continuously adjustable by a filter compression adjustment. In some embodiments, the filter compression adjustment comprises a torque limiter. When employed, the torque limiter may have a torque limit of less than about 12 N·m.

In some embodiments, the tilt axis is located a first distance from the work surface and the base end of the holder arm is located a second distance from the tilt axis, the second distance being less than the first distance.

The holder arm may comprise a front support bar and a rear support bar, the holding plate being slidably connected to the front support bar and the rear support bar. In some embodiments, the compression plate is slidably connected to the front support bar and the rear support bar. In some embodiments, front support bar and the rear support bar each comprise a plurality of plate positioning grooves. In some embodiments, when the holder arm is in the ergonomic loading position, the front support bar is positioned below the tilt axis, and the rear support bar is positioned at or above the tilt axis.

In one embodiment, when in the service position, the holder arm is oriented orthogonal to the work surface, and when in the ergonomic loading position, the holder arm is oriented parallel to the work surface.

Typically, the tilt axis is located a first distance from the work surface, the first distance being in a range from about 28 inches to about 40 inches.

In one embodiment, when the holder arm is in the ergonomic loading position the center of gravity of the holder arm is not vertically aligned with the tilt axis, and, when the holder arm is in the service position, the center of gravity of the holder arm is substantially vertically aligned with the tilt axis.

In some embodiments, the filter holder is mobile. In one embodiment, the base comprises one or more casters.

The present disclosure also provides a filter system comprising a filter holder as described above and a filter capsule stack loaded onto the holder arm. In some such embodiments, when the holder arm is in the ergonomic loading position the center of gravity of the holder arm loaded with the filter capsule stack is not vertically aligned with the tilt axis, and, when the holder arm is in the service position, the center of gravity of the holder arm loaded with the filter capsule stack is substantially vertically aligned with the tilt axis.

The present disclosure further provides a method of operating a filter holder comprising tilting a holder arm to an ergonomic loading position, loading a filter capsule stack onto the holder arm, and tilting the holder arm about a tilt axis to a service position. In some embodiments, when in the service position, the holder arm is in a vertical orientation, and when in the ergonomic loading position, the holder arm is in a horizontal orientation.

In one embodiment, loading the filter capsule stack onto the holder arm comprises compressing the filter capsule stack between a compression plate and a holding plate. In such embodiments, the method may further comprise locking the holding plate to prevent it from sliding. In one embodiment, the method further comprises adjusting the compression of the filter capsule stack between the compression plate and the holding plate. In some cases, compression of the filter capsule stack is adjusted by a filter compression adjustment comprising a torque limiter, wherein the torque limit is less than about 12 N·m.

In one embodiment, the method further comprises tilting the holder arm from the service position back to the ergonomic loading position and unloading the filter capsule stack from the holder arm. In some embodiments, unloading the filter capsule stack from the holder arm comprises rotating a filter capsule over a front support bar. In some such embodiments, rotating the filter capsule over a front support bar comprises engaging a fulcrum lug on the filter capsule against the front support bar and rotating the filter capsule about the fulcrum lug to roll the filter capsule over the front support bar.

In one embodiment of the method, when the holder arm is in the ergonomic loading position the center of gravity of the holder arm loaded with the filter capsule stack is not vertically aligned with the tilt axis, and, when the holder arm is in the service position, the center of gravity of the holder arm loaded with the filter capsule stack is substantially vertically aligned with the tilt axis.

In one embodiment, the method further comprises transporting the filter holder from one room in a manufacturing facility to another room in a manufacturing facility. In some embodiments, transporting the filter holder comprises wheeling the filter holder over a work surface on one or more casters.

The present disclosure also provides a filter holder comprising a base for supporting the filter holder on a work surface, one or more casters attached to the base, and a holder arm attached to the base in a service position. In one embodiment, the filter holder further comprises a compression plate. In some embodiments, the base comprises a holding plate.

In one embodiment, the filter holder further comprises a front support bar and a rear support bar. In some such embodiments, the compression plate is slidably connected to the front support bar and the rear support bar. In one embodiment, the compression plate is continuously adjustable by a filter compression adjustment. In some embodiments, the filter compression adjustment comprises a torque limiter.

In some embodiments, the front support bar and the rear support bar each comprise one or more plate positioning grooves. Further, in some embodiments, the filter holder may comprise one or more cradle bars.

The present disclosure also provides a filter system comprising a filter holder as described elsewhere in this disclosure and a filter capsule stack loaded onto the holder arm. In some embodiments, the filter capsule stack comprises one or more filter capsules, each filter capsule comprising one or more alignment wings, wherein each alignment wing is fitted against one of the front support bar or the rear support bar.

In one embodiment, the filter capsule stack is compressed between the compression plate and the holding plate.

In some embodiments, the filter capsule stack does not comprise a coupling plate. In one embodiment, each filter capsule in the filter capsule stack comprises a fluid interconnect, wherein the fluid interconnect on each filter capsule is fluidly coupled and sealed directly to an adjacent filter capsule. In some embodiments, the fluid interconnect comprises a face seal.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE DRAWINGS

Figure 1:
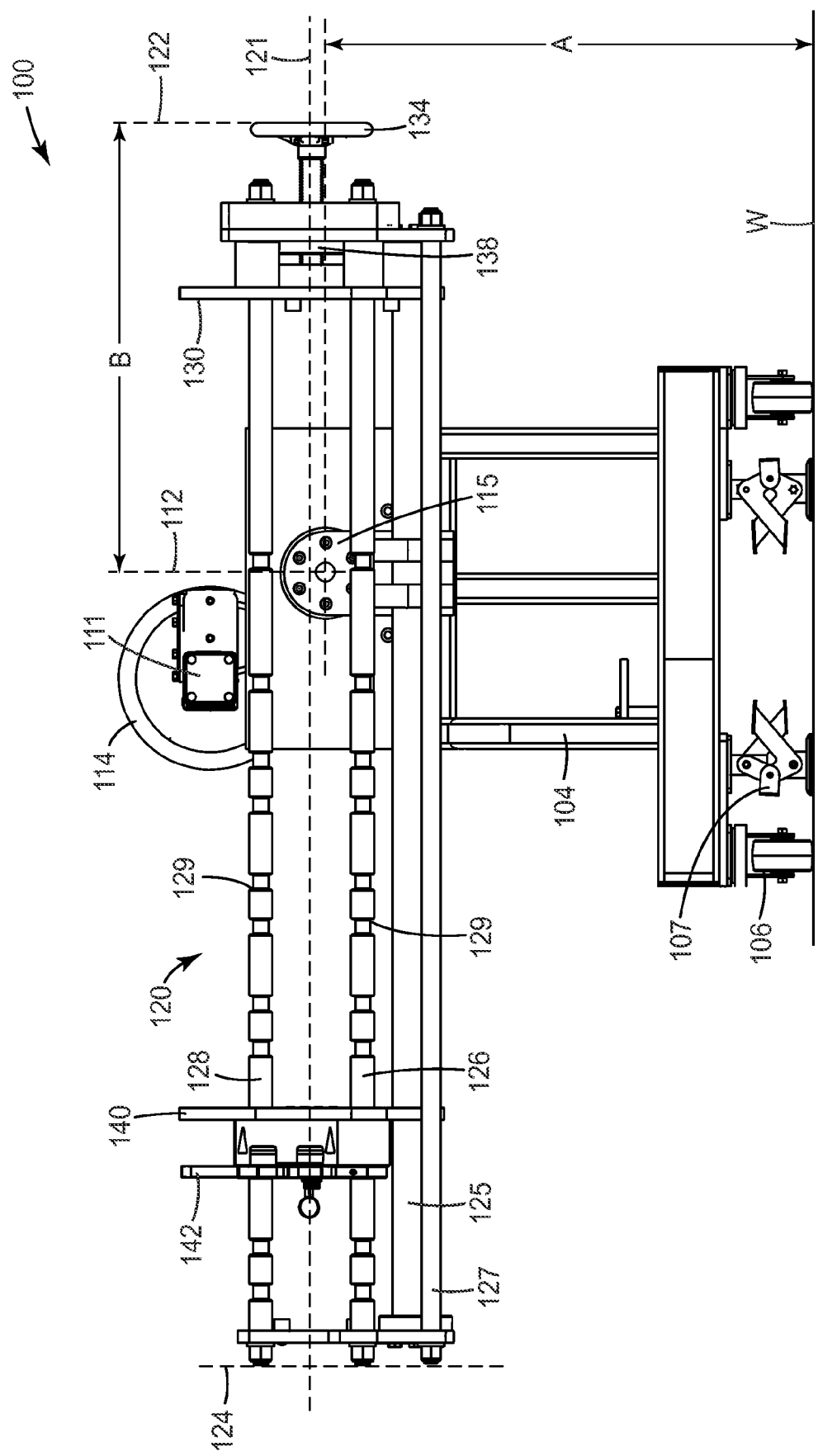
FIG. 1 is a front view of a filter holder according to the present disclosure with a holder arm in an ergonomic loading position.
Figure 5:
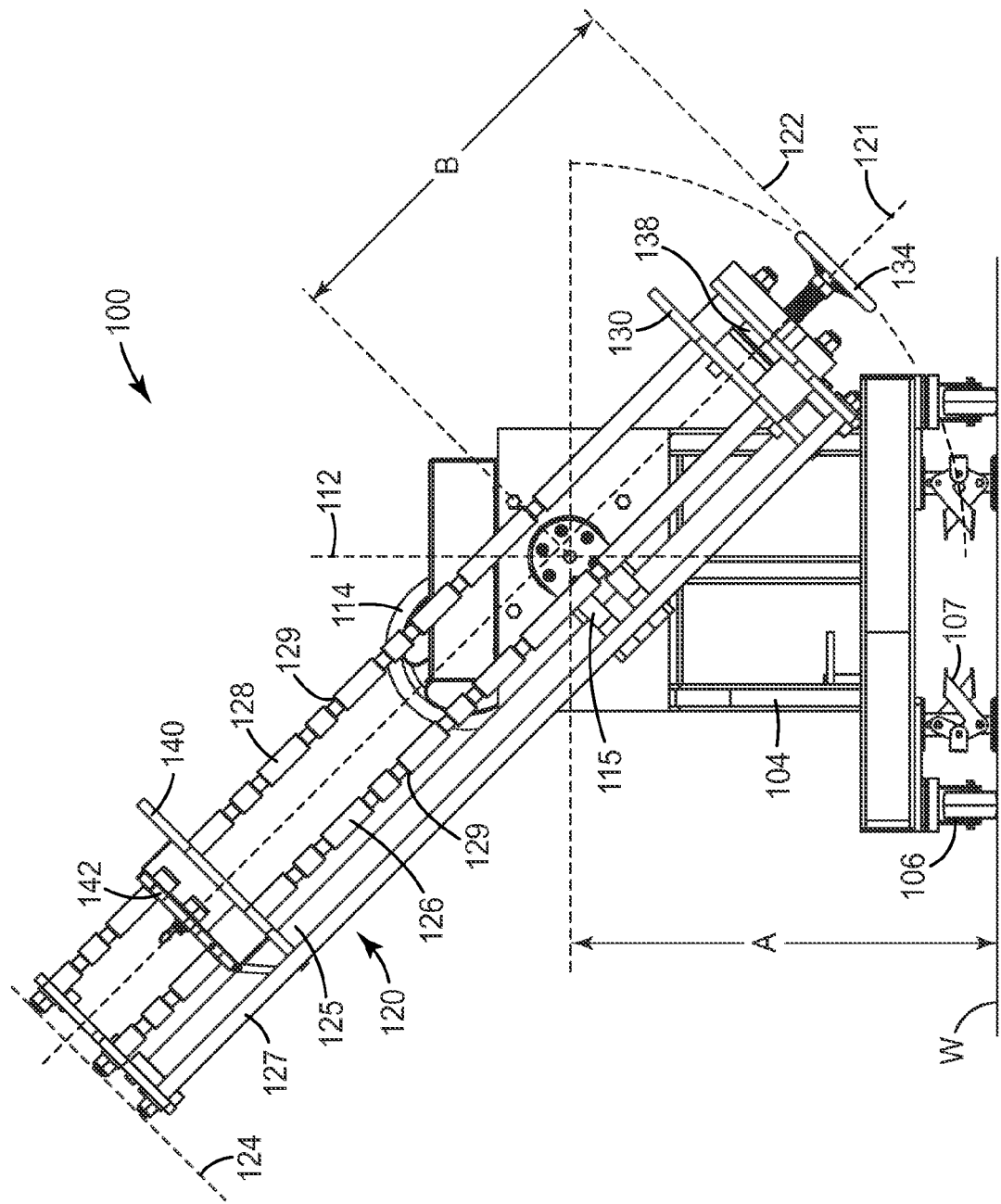
FIG. 5 is a front view of a filter holder according to the present disclosure with a holder arm in an intermediate position between an ergonomic loading position and a service position.
Figure 6:
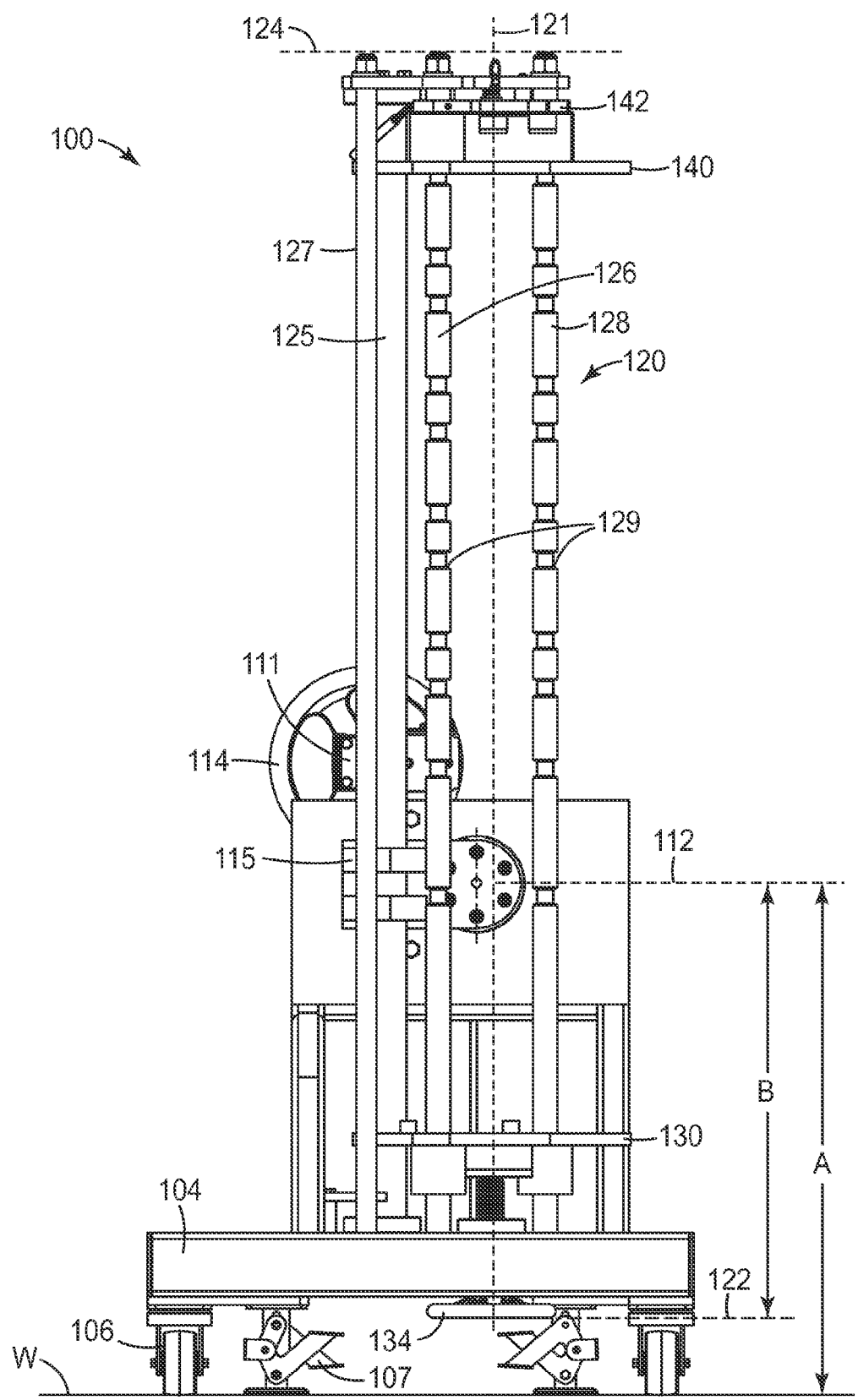
FIG. 6 is a front view of a filter holder according to the present disclosure with a holder arm in a service position.

FIG. 1 depicts an exemplary filter holder 100 according to the present disclosure. As shown filter holder 100 comprises a base 104 that supports filter holder 100 on a work surface W. In the embodiment shown, the filter holder 100 comprises a tilting mechanism 110 comprising a tilt axis 112. A holder arm 120 is attached to the tilting mechanism 110 at the tilt axis 112 such that the holder arm 120 is tiltable to a service position and an ergonomic loading position. As shown in FIG. 1, the holder arm 120 is in the ergonomic loading position. FIG. 6, for example, depicts the holder arm 120 in the service position. FIG. 5 depicts the holder arm 120 in an intermediate position between the ergonomic loading position and the service position.

As used herein, "service position" means the position of the holder arm 120 corresponding to actual operation of the filter holder 100 as a filtration system. When in the service position, the holder arm 120 is generally vertically oriented. However, the service position includes angular deviation from a vertical orientation, for example, in a range from about 75 degrees to about 105 degrees from horizontal or, more typically, from about 85 degrees to about 95 degrees from horizontal. In some embodiments, the holder arm 120 is oriented orthogonal to the work surface W when in the service position.

As used herein, "ergonomic loading position" means the position of the holder arm 120 corresponding to loading or unloading of filter capsules 200 onto and from the holder arm 120. When in the ergonomic loading position, the holder arm 120 is generally horizontally oriented. However, the ergonomic loading position includes angular deviation from horizontal, for example, in a range from about −15 degrees to about +15 degrees from horizontal or, more typically, from about −5 degrees to about +5 degrees from horizontal. The ergonomic loading position is distinct from the service position. Moreover, the ergonomic loading position is only applicable to embodiments where the holder arm 120 is tiltable to a service position and an ergonomic loading position. In one embodiment, the holder arm 120 is oriented parallel to the work surface W when in the ergonomic loading position.

Figure 11:
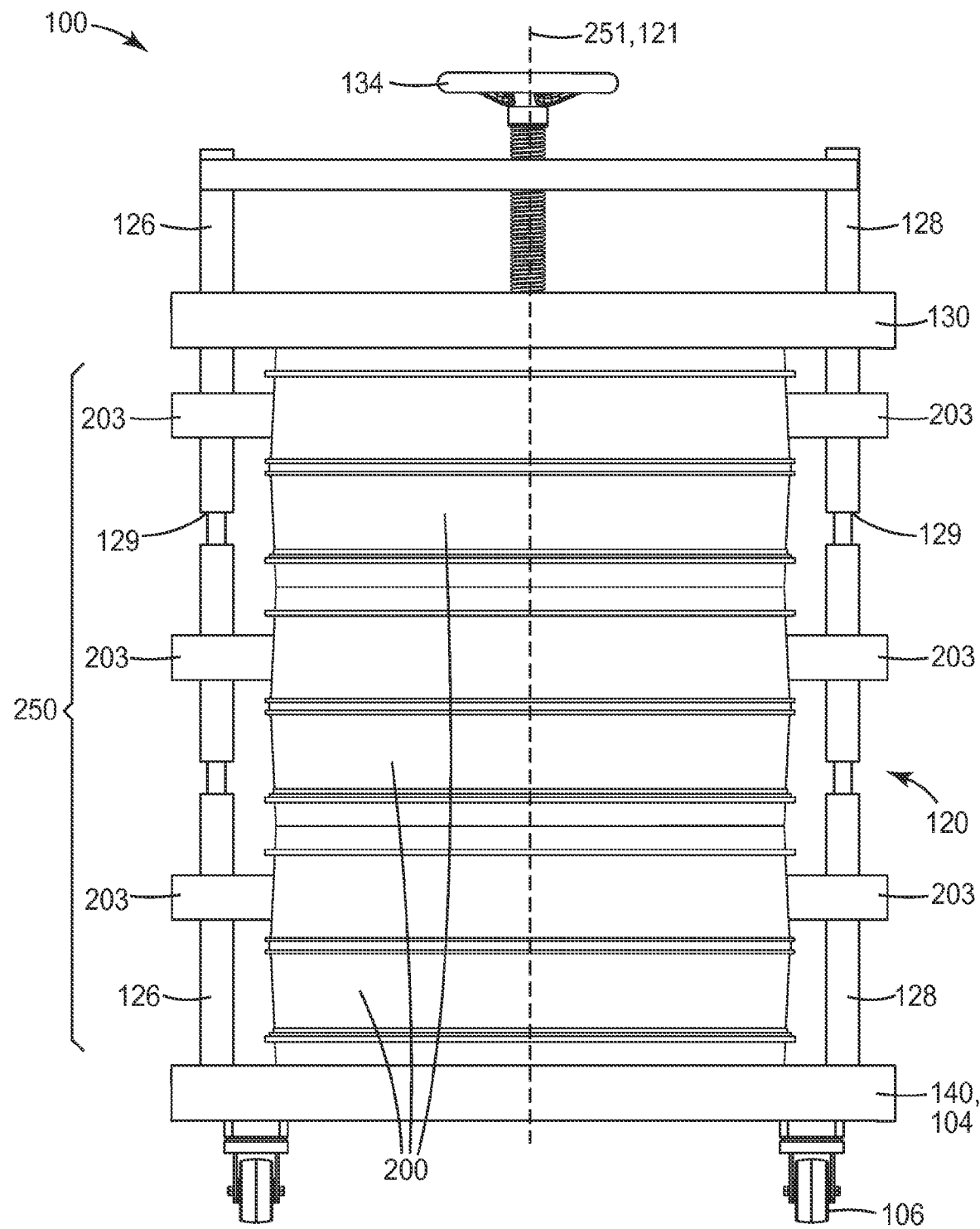
FIG. 11 is a front view of a filter holder according to the present disclosure with a holder arm in a service position wherein the holder arm comprises one or more filter capsules in a filter capsule stack.
Figure 13:
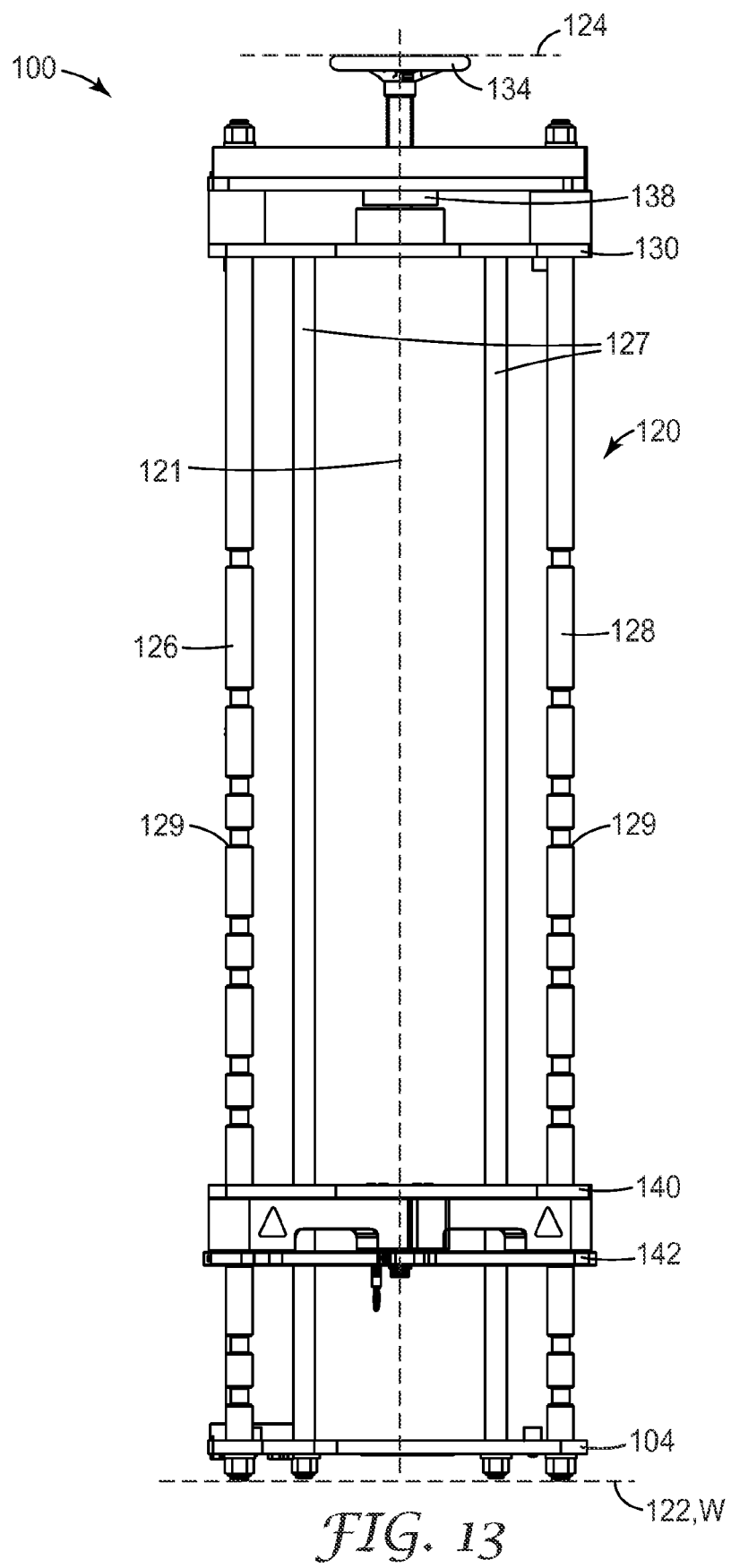
FIG. 13 is a front view of a filter holder according to the present disclosure with a holder arm in a service position.

Filter holders 100 according to the present disclosure may be provided with a holder arm 120 that is either (i) tiltable to a service position and an ergonomic loading position, or (ii) fixed in the service position (non-tiltable; see, e.g., FIGS. 11 and 13). Both configurations present advantages over known filter holders.

For example, operation of a filter holder 100 with a holder arm 120 in the service position allow for easier and more efficient venting of excess gas from the filter capsule stack 250 when the filter capsule stack 250 is being charged with a fluid before a filtering operation. Venting is easier because excess gas can escape upward through existing fluid connection ports positioned at the top of the filter capsule stack 250. Filter capsules 200 can be discarded after each use, thereby saving on process time and reducing or eliminating the cost of sanitizing agents. Moreover, filter capsules 200 may be connected directly to one another in a filter capsule stack 250 without the need for bulky coupling plates in between capsules. Thus, the entire filter capsule stack 250 may be assembled more easily, with directly interfacing filter capsules 200 that may be discarded without the need to clean or handle coupling plates. Moreover, because the service position is typically a substantially vertical orientation, the filter holder 100 can take up much less floor space than a unit that is fixed in a horizontal orientation. In other words, the filter holder 100 can have a substantially reduced footprint when in the service position.

However, filter capsules 200 can still be cumbersome to load and unload while the holder arm 120 is in a service position. This difficulty can be amplified during unloading steps because the used filter capsules 200 often contain residual fluid that can make them much heavier.

For example, where disposable filter capsules 200 must be loaded and unloaded in a vertical stack, operators may need to bend down to handle the lowest filter capsules 200 in the stack, and may need to climb a ladder or stool in order to handle the highest filter capsules 200 in the stack. Moreover, to manipulate the highest filter capsules 200 in the stack, it may be necessary for operators to reach high over their heads for loading or unloading, and then move the filter capsules 200 in a lateral motion to move them away from the stack. Such motions can place undue strain on the operator, particularly for operators who are less able to handle heavier loads. Moreover, as depicted in FIGS. 11 and 13, a filter compression adjustment 134 on such a fixed vertical unit may be located at the distal end 124 of the holder arm 120. This location may be above the reach of the operator. As such, the operator may need to climb a ladder or stool to adjust the filter compression adjustment 134.

Figure 8:
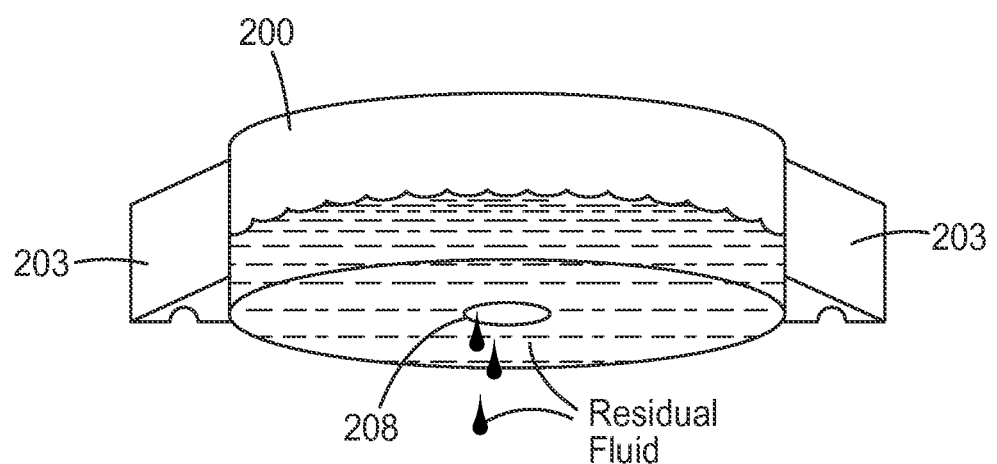
FIG. 8 is a perspective view of a filter capsule according to the present disclosure.

In addition to the above concerns, unloading filter capsules 200 from a vertical stack can result in leaking of residual fluid through ports in the bottom of each stacked filter capsule 200, as depicted in FIG. 8.

Fixed horizontal designs, where disposable filter housings may be loaded and unloaded horizontally onto a fixed horizontal rack, are also possible. However, such designs tend to consume a relatively large amount of floor space compared with systems that operate vertically. One way to mitigate the larger floor space requirement is to configure the design to hold multiple horizontal rows of disposable filter housings, one above the other. However, doing so results in at least some of these horizontal rows being located either too high or too low for easy loading and unloading by an operator. Thus, the operator may still need to bend down to load and unload the lowest rows, and may need to climb a ladder or stool for the highest rows.

Moreover, a fixed horizontal design may also be more difficult to purge or vent of excess gas while charging the system with a fluid. Because gravity causes fluid to pool at the bottom of the filter housings, any excess gas will collect at the top of the horizontally oriented filter housings. This means that separate venting plumbing must be provided along the "top" of the filter housings, in addition to the typical fluid ingress and egress provided within the heart of the housings. Such more complicated plumbing can mean, for example, more plumbing connections to be made and more potential locations where seals could fail.

Thus, operation of a filter holder 100 with a holder arm 120 in the service position may be advantageous to operation in a fixed horizontal position.

Figure 2:
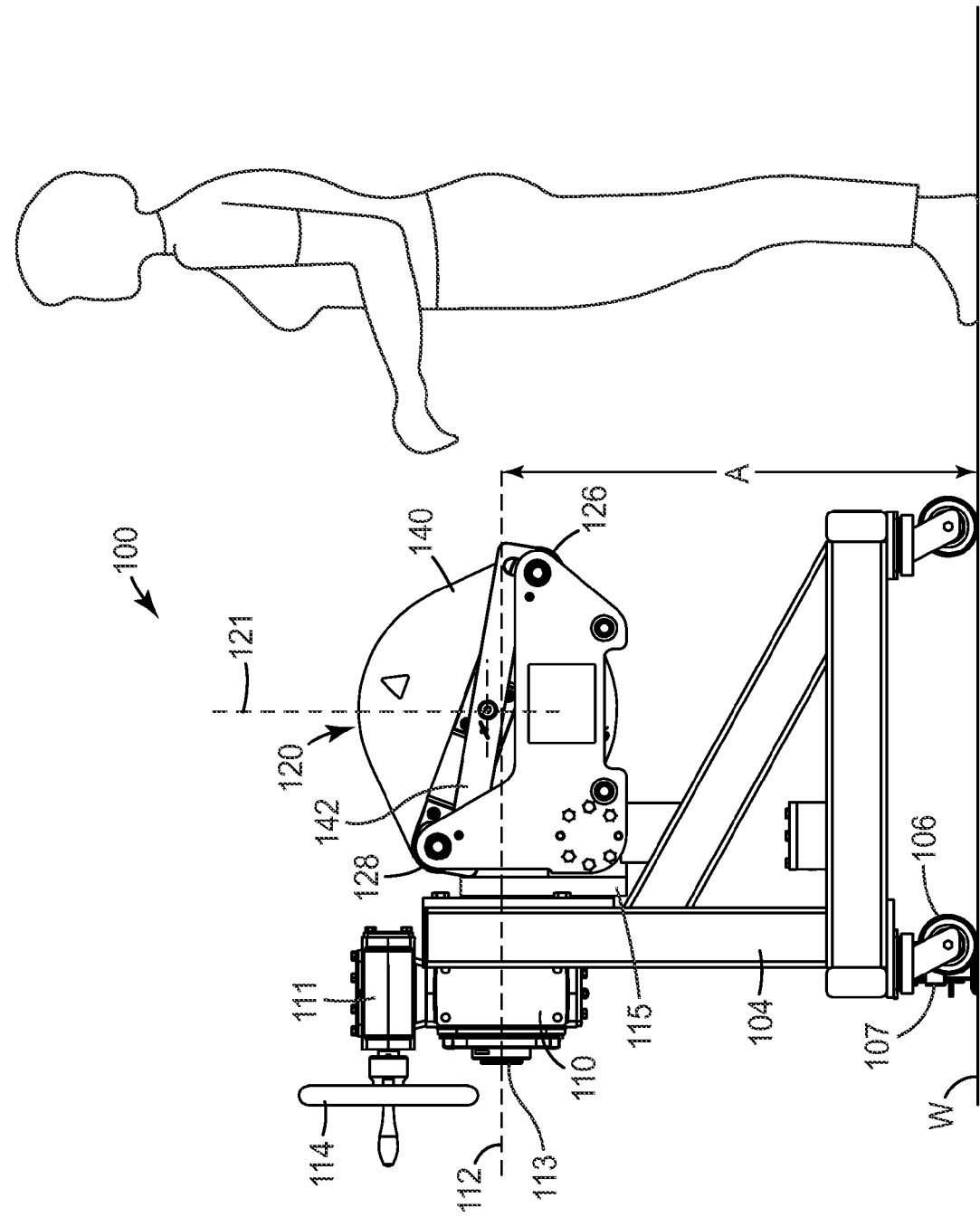
FIG. 2 is a side view of a filter holder according to the present disclosure with a holder arm in an ergonomic loading position along with an operator standing on the front side of the filter holder.
Figure 3:
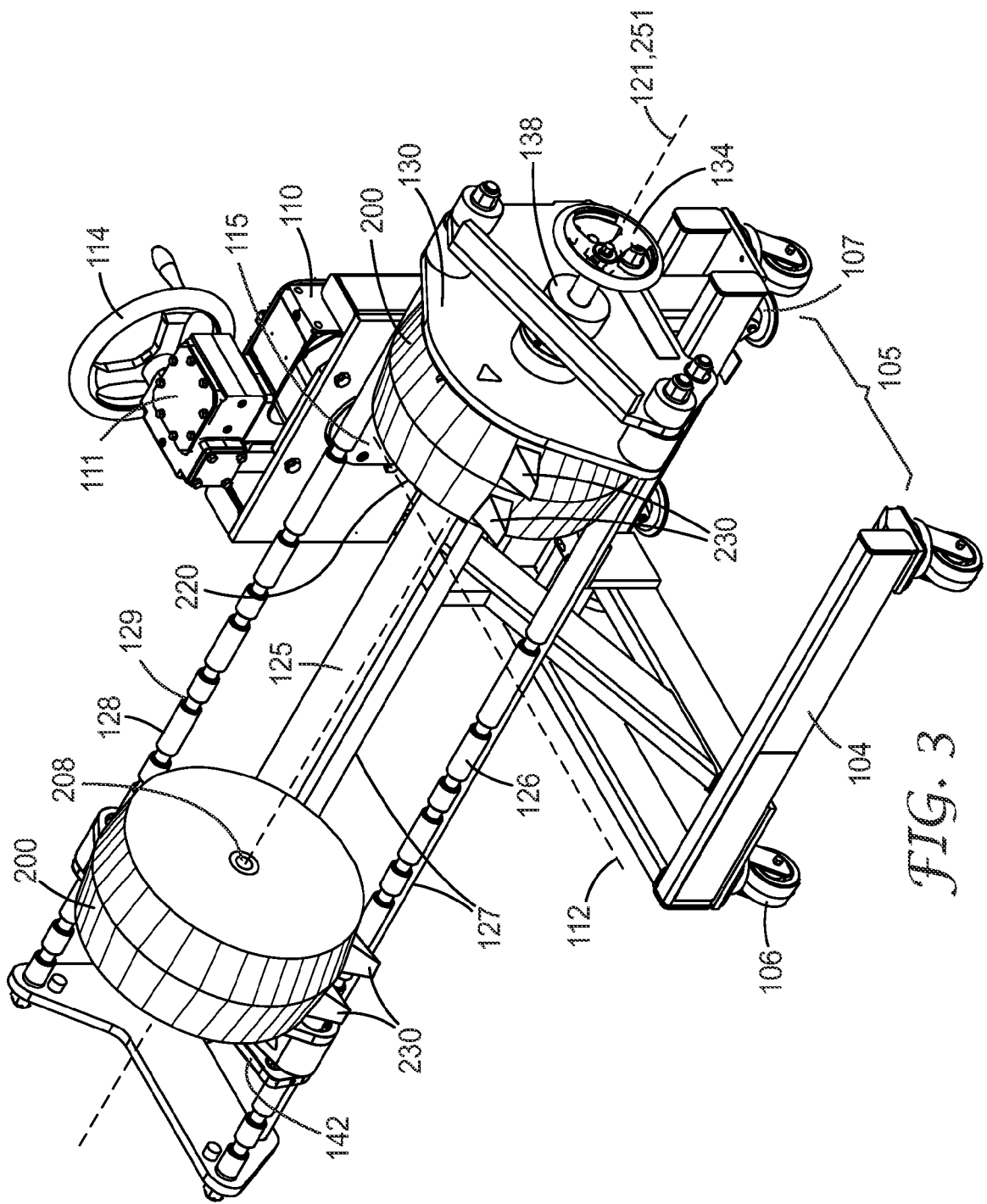
FIG. 3 is a perspective view of a filter holder according to the present disclosure with a holder arm in an ergonomic loading position, wherein the holder arm comprises one or more filter capsules.

On the other hand, filter holders 100 comprising holder arms 120 that are tiltable to a service position and an ergonomic loading position enjoy all of the benefits described above with regard to those fixed in a service position, in addition to further benefits. For example, as shown in FIG. 2, filter capsules 200 can be loaded and unloaded from the holder arm 120 much more easily because the filter capsules are all presented to an operator at an ergonomic height where no bending over or climbing must be done. Tilting the holder arm is easily accomplished by a tilting mechanism 110 that is ergonomically placed for the convenience of the operator. Moreover, all routine steps of locking or unlocking the filter capsule stack 250 into place on the holder arm 120, disposing of used filter capsules 200, adjusting compression of the filter capsule stack 250, making or breaking plumbing connections, etc., are available to the operator at a comfortable, ergonomic height.

The base 104 may comprise any form of structure adapted to support the weight of the filter holder 100 above a work surface W. It should be understood that the work surface W does not form a part of the filter holder 100, but is merely described to provide appropriate context for the features of the filter holder 100. As shown in FIGS. 1-6 and 11, base 104 comprises casters 106 that allow the filter holder 100 to be moved about the work surface W. The base 104 may further comprise lockable floor jacks 107 to lock the filter holder 100 into position on the work surface W and prevent it from rolling. It is also envisioned that the base 104 could be affixed to the work surface W.

However, the provision of casters 106 on the base allows the filter holder 100 to be mobile and therefore have the potential to serve multiple rooms in a manufacturing facility. Such mobility can provide substantial cost and efficiency benefits because one mobile filter holder 100 can fulfill the duty of multiple fixed filtration systems. Furthermore, rather than having to clean and sanitize a sanitary housing and other parts in one room before filtering using that room again for filtration, a mobile filter holder 100 may simply be wheeled in, loaded, and operated with less delay. For example, multiple rooms, each comprising large scale-up manufacturing fixtures, may simply be provided with appropriate plumbing connections to interface with a mobile filter holder 100 according to the present disclosure.

Although not visible in the view shown in FIG. 1, the base 104 may comprise a pass-through side 105 (see, e.g., FIG. 3) to allow the base end 122 of the holder arm 120 to swing through and rest in the service position as close to the work surface W as possible. Such a configuration allows for advantageous loading and operating conditions for the filter holder 100.

For example, the larger the second distance B can be made, the more filter capsules 200 (not shown in FIG. 1) may be placed between the tilt axis 112 and the base end 122. At the same time, however, the tilt axis 112 is preferably positioned at a comfortable height above the work surface W (a first distance A), to allow for easier loading and unloading of filter capsules 200 while the holder arm 120 is in the ergonomic loading position. Because the second distance B is effectively a radius for the swing of the base end 122 of holder arm 120, it is evident that if the second distance B were greater than the first distance A, the base end 122 would interfere with the work surface W while the holder arm 120 was tilting into the service position. It is thus desirable to fix the first distance A at a comfortable level above the work surface W, and then select the second distance B to be as close to the first distance A as possible while preventing interference of the base end 122 with the work surface W. In order to maximize the second distance B, the pass-through side 105 of the base 104 allows the holder arm 120 to swing through the base without interference. Thus, the pass-through side 105 can help to simultaneously allow (1) ergonomic positioning of the tilt axis 112 above the work surface W, and (2) increased capacity of the holder arm 120 to hold filter capsules 200.

The tilting mechanism 110, where employed, is typically mounted on the base 104, as shown in FIG. 1, and functions to tilt the holder arm 120 about the tilt axis 112. Because the holder arm 120 can be quite heavy when loaded with filter capsules 200, particularly when the filtration media is saturated with fluid, the tilting mechanism 110 must be capable of generating substantial torque about the tilt axis 112. This is particularly so when the center of gravity of the holder arm 120 is offset from the tilt axis 112 when the holder arm is in the ergonomic loading position. In such a condition, where a load is imbalanced about the tilt axis 112, there can be a substantial moment of force to be overcome to tilt the holder arm 120 upward and into the service position.

In embodiments of the present disclosure, (i) the placement of the tilt axis 112, and (ii) the length of the holder arm 120 between the base end 122 and a distal end 124 can be optimized (e.g., maximizing the swing radius [the second distance B] of the holder arm 120, and further allowing for the loading as many filter capsules 200 onto the holder arm 120 as practical). Thus, it may result that the center of gravity of the holder arm 120 is substantially offset from the tilt axis 112 when the holder arm 120 is loaded with filter capsules 200.

For example, it may be desirable to effectively fill the space between the base end 122 and a distal end 124 of the holder arm 120 with filter capsules 200. As viewed in FIG. 1 (again, shown without filter capsules 200), such a loading would likely offset the center of gravity to the left-hand-side of the tilt axis. The desirability of this offset center of gravity configuration is not intuitive, as conventional design would tend to fix the center of gravity of a rotating load as close to the axis of rotation as possible. However, a departure from this conventional load-balancing approach allows the dual benefit of easier loading and unloading of the filter holder 100, while at the same time maximizing filtration capacity and minimizing the total system footprint while in operation.

For example, turning to FIG. 5, an exemplary filter holder 100 is shown wherein the holder arm 120 is tilted to an intermediate position between the service position and the ergonomic loading position. The holder arm 120 is shown here without a filter capsule stack 250 so that the underlying features of the filter holder are more clearly visible. As can be seen, the second distance B corresponds to a swing radius of the holder arm 120 as the base end 122 swings toward the work surface W. As shown, the base 104 comprises a pass-through side 105 (see, e.g., FIG. 3) through which the based end 122 passes on its way to the service position, as shown in FIG. 6. As can be seen by following the trajectory of the swing radius in FIG. 5, the base end 122 of the holder arm 120 will clear the work surface W.

The distance between the tilt axis 112 and the distal end 124 of the holder arm 120 is typically, though not necessarily, greater than the second distance B, as shown clearly in FIGS. 5 and 6. This is because, while the based end 122 must clear the work surface W as it swings down while tilting, the distal end 124 is not so constrained. Therefore, so long as an overhead ceiling does not interfere with the distal end 124 as it swings into the service position, it may be desirable to increase the overall length of the holder arm 120 (the distance between the based end 122 and the distal end 124) to increase the number of filter capsules 200 that can be simultaneously loaded into the filter holder. Of course, the greater the disparity between the overall length of the holder arm 120 and the second distance B, and the greater the number of filter capsules 200 loaded onto the holder arm 120, the greater is the potential that the load carried by the holder arm 120 may be grossly imbalanced about the tilt axis 112.

It will be understood, however, that, after a holder arm 120 whose load is imbalanced about the tilt axis 112 is tilted into the service position, the center of gravity of the holder arm 120 loaded with filter capsules 200 will come to rest substantially vertically aligned with the tilt axis 112. As used herein, "substantially vertically aligned" includes conditions of near-alignment. For example, a vertical line drawn through such center of gravity while the holder arm 120 is in the service position may not exactly intersect with the tilt axis 112, but may be offset to either side of the tilt axis 112 by up to about 6 inches, including about 1 inch, 2 inches, 3 inches, 4 inches, and even 5 inches. With such substantial vertical alignment of the center of gravity and the tilt axis 112, there will be substantially no gravity-induced moment or torque about the tilt axis 112, or such gravity-induced moment or torque will be minimized.

Figure 16:
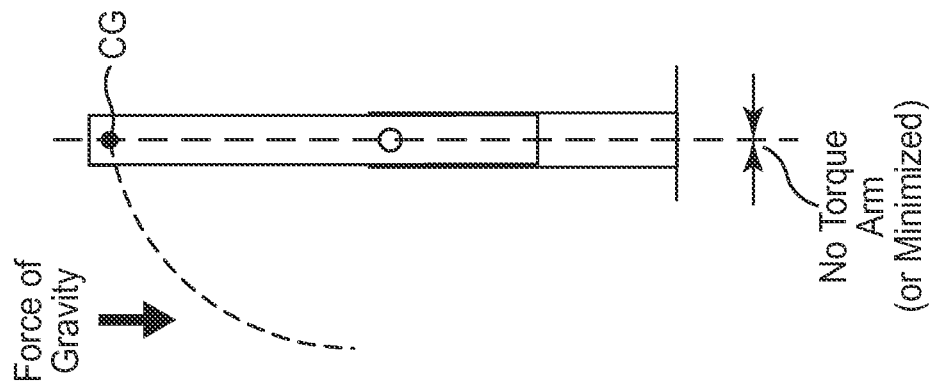
FIG. 16 is a front view of a simple machine having an arm in a vertical position.
Figure 15:
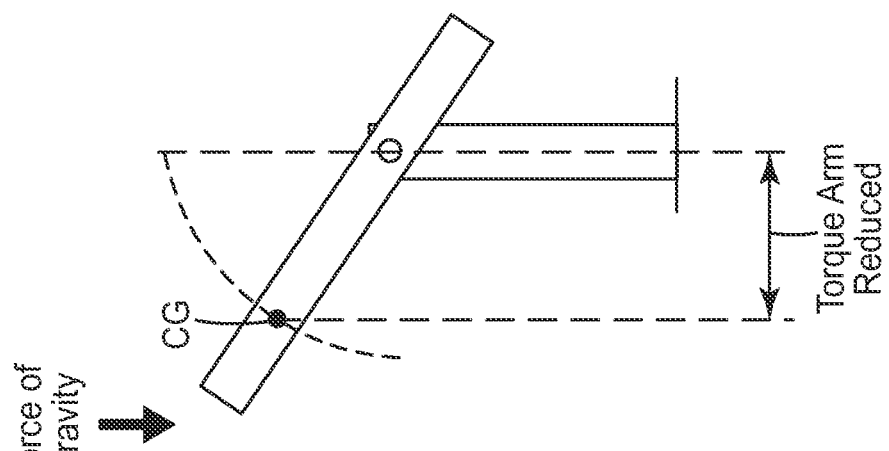
FIG. 15 is a front view of a simple machine having an arm in an intermediate position between horizontal and vertical.
Figure 14:
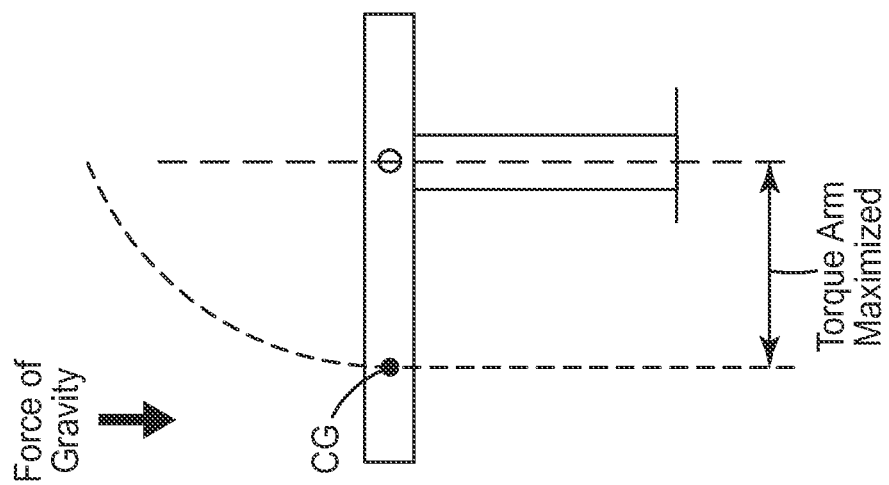
FIG. 14 is a front view of a simple machine having an arm in a horizontal position.

The conditions described in the preceding paragraphs may be better understood by reference to FIGS. 14-16 depicting a simplified machine having an arm in various stages of tilting. As shown, the arm has a center of gravity ("CG") that is offset from the axis about which the arm tilts. When the arm is positioned horizontally, as in FIG. 14, the gravity-induced moment is maximized. When the arm is positioned vertically, as in FIG. 16, the gravity-induced moment is minimized. It should be understood that the location of the "CG" as depicted in FIGS. 14-16 is not necessarily representative of the actual location of the "CG" in a holder arm 120 according to the present disclosure, but rather is placed in the figures to demonstrate the general principle of reduction of gravity-induced torque about the tilt axis 112 as the holder arm 120 is tilted into the service position. It should also be understood that the location of the "CG" in an actual holder arm 120 will vary according to the construction of the holder arm 120, the number or size of filter capsules 200 loaded onto the holder arm 120, and the presence of residual fluid in the filter capsules 200.

In one embodiment, the tilting mechanism 110 comprises a gear box 111. Typically, a tilt shaft 113 at the tilt axis 112 is coupled, through the gear box 111, to a hand crank 114 operable to tilt the holder arm 120 to a service position and an ergonomic loading position. It is also envisioned that the tilting mechanism 110 could comprise a motor or be hydraulically operated. It may preferable, however, to avoid the need for electricity in the tilting mechanism 110, particularly where the filter holder 100 may be used in wet conditions or where working fluid may drip onto the filter holder 100.

The holder arm 120 according to the present disclosure may be attached to a tilting mechanism 110 at a tilt axis 112, or it may be fixed to a base 104 in a vertical orientation. For reasons discussed throughout the present disclosure, a tilting configuration can have a variety of advantages over a fixed vertical configuration. Nevertheless, fixed vertical configurations according to the present disclosure are an improvement over known filter holders.

As shown in FIG. 1, holder arm 120 comprises a base end 122 and a distal end 124 connected by a front support bar 126 and a rear support bar 128. In some embodiments, as shown in FIG. 1, at least one cradle bar 127 and optionally a load-bearing bar 125 disposed parallel to the front and rear support bars 126, 128 may further be employed. In one embodiment, the holder arm 120 is coupled to the tilting mechanism by a holder bracket 115.

It should be understood that terms such as "front" and "rear" are used herein only to clarify a relative position of one feature to another, and are not intended to limit the location of such features to any particular portion of the filter holder 100, or limit the filter holder 100 to any particular orientation. For example, the front and rear support bars 126, 128 may be located on opposing sides of the filter holder 100, as clarified in FIGS. 11 and 13.

In some embodiments, the at least one cradle bar 127 may provide support and alignment for a filter capsule 200 to keep the first axis 251 of the filter capsule stack 251 aligned with the holder arm axis 121, and at the same time prevent the filter capsule 200 from falling through the space between front and rear support bars 126, 128 while the holder arm 120 is in the ergonomic loading position. However, in other embodiments, particularly where the holder arm 120 remains fixed in the service position, it may be advantageous to align filter capsules 200 using the front and rear support bars 126, 128. For example, each filter capsule 200 may be configured with one or more alignment wings 203 to slidably engage one or more of the front and rear support bars 126, 128. Exemplary filter capsules 200 comprising two opposing alignment wings 203 are depicted in FIGS. 8 and 11. An alignment wing 203 may comprise, for example, a semicircular bore corresponding to the diameter of front and/or rear support bars 126, 128 into which front and/or rear support bars 126, 128 can fit. Thus, as clearly shown in FIG. 11, placement of a filter capsule 200 having alignment wings 203 onto a holder arm 120, where opposing alignment wings 203 are fitted against front and rear support bars 126, 128, can assure that the first axis 251 of the filter capsule stack 251 is held in alignment with the holder arm axis 121. In such embodiments, one or more cradle bars 127 may still be employed to, for example, provide improved rigidity to the holder arm 120.

Front and rear support bars 126, 128 may each comprise a plurality of plate positioning grooves 129 distributed along their respective lengths. In one embodiment, the plate positioning grooves 129 are spaced along the length of the front and rear support bars 126, 128 at intervals corresponding to the height of different configurations of filter capsule stacks 250 that may be loaded into the holder arm 120. Plate positioning grooves 129 may be clearly seen, for example, in FIGS. 1, 3-6, 11, and 13.

In some embodiments, holder arm 120 comprises a compression plate 130 and a holding plate 140 disposed opposite the compression plate 130. One or more of the compression plate 130 or the holding plate 140 may be movable along the length of the front and rear support bars 126, 128. For example, the holding plate 140 may be fixed upon the holder arm 120, while the compression plate 130 is movable. Similarly, the compression plate 130 may be fixed upon the holder arm 120, while the holding plate 140 is movable. In other embodiments, both the holding plate 140 and the compression plate 130 are movable. In such embodiments, the holding plate 140 is typically movable incrementally to locations corresponding to the locations of plate positioning grooves 129, while the compression plate 130 is continuously adjustable over a smaller range to provide a compressive force to the filter capsule stack once the holding plate 140 has been moved into place. While the embodiment depicted in FIG. 1 depicts the compression plate 130 proximate the base end 122 of the holder arm 120, it is also envisioned that the compression plate 130 and the holding plate 140 may be flipped such that the holding plate 140 is proximate the base end 124, as shown in FIGS. 11 and 13. In some embodiments, one or more of the holding plate 140 and the compression plate 130 are slidably connected to the front and rear support bars 126, 128. Slidable connection of the holding plate 140 or the compression plate 130 to the front and rear support bars 126, 128 may be accomplished by, for example, one or more linear bearings.

As depicted, for example, in FIG. 1, the holding plate 140 may further comprise a locking bar 142 that is co-movable along the front and rear support bars 126, 128. The locking bar 142 can lock into a plate positioning groove 129 one or both of the front and rear support bars 126, 128, thereby positively locking the holding plate 140 into a pre-set position on the holder arm 120. In one embodiment, the locking bar 142 is rotatable to a locked position and an unlocked position. In the locked position, the locking bar 142 may be simultaneously engaged in plate positioning grooves 129 on both front and rear support bars 126, 128. It is also envisioned that the holder plate 140 or the compression plate 130 may be lockable into one or more plate positioning grooves 129 without the provision of a separate locking bar 142.

FIG. 1 further shows a filter compression adjustment 134 coupled to the compression plate 130. While shown here at the base end 122 of the holder arm 120, the filter compression adjustment may also be located at the distal end 124. Filter compression adjustment 134 adjusts the compression plate 130 along the front and rear support bars 126, 128 to apply compressive force to a filter capsule stack 250. Such an application of compression may be necessary because, for example, fluid to the filtered in the filter capsule stack 250 may be provided at elevated pressures, and the compressive contact of the holding plate 140 and the compression plate 130 against the ends of the filter capsule stack 254 can help to prevent deformation, separation, or rupture of the filter capsules 200. The filter compression adjustment 134 may comprise, for example a turnable acme screw or ball screw fixed at one point to the compression plate 130 and threadably coupled at another point to a member that is rigidly affixed to the holder arm.

In some embodiments, the filter compression adjustment 134 is provided with a torque limiter 138 to act as a proxy to limit the compressive force that can be applied to the filter capsule stack 250. The torque limiter 138 may be, for example, a friction-based or magnetic slip clutch. Provision of a torque limiter 138 may be advantageous, for example, when filter capsules 200 having fluid interconnects 208 and fluid seals as described in commonly owned U.S. Pat. App. No. 61/111,156 to Cashin et al., entitled "Fluid Interconnect" (hereinafter "Cashin") and U.S. Pat. App. No. 61/111,185 to Marks et al., entitled "Filter Element and Seal Therefor," (hereinafter "Marks") both of which are hereby incorporated by reference in their entirety. With the provision of such filter capsules, much less compressive force may be required to safely operate the filter holder 100, as is described in Cashin on page 9, line 20 through page 10, line 5 (reproduced below with reference and figure numbers omitted):

In some embodiments, the sealing member is located on a vertical sealing surface . . . . When a vertical sealing surface is used, the sealing member slides along an opposing sealing surface in a direction parallel to the first axis during connection of the fluid interconnect. Consequentially, any slight axial movement of the sealing member with respect to the opposing sealing surface during operation of the filtration system does not result in disruption of the seal. Therefore, forceful axial compression of the fluid interconnect is not necessary. In contrast, when a face-seal configuration is employed, i.e. wherein a seal is created by axial force on a sealing member against a surface perpendicular to the first axis, care must be taken to avoid any axial movement. In such a face-seal configuration, any such axial movement would tend to disrupt or break the seal, allowing fluid bypass. In such face-seal configurations, forceful axial compression of the fluid interconnect may be required. While it is envisioned that a face-seal could be employed within the scope of the present disclosure, a sealing member located on a vertical sealing surface is preferred because it can result in a more forgiving connection.

Thus, the torque limiter 138 may be set to limit the torque applied by the filter compression adjustment 134, for example, to about 16 Nm (142 lb·in), 15 Nm (133 lb·in), 14 Nm (124 lb·in), 13 Nm (115 lb·in), 12 Nm (106 lb·in), 11 Nm (97 lb·in), 10 Nm (89 lb·in), 9 Nm (80 lb·in), 8 Nm (71 lb·in), 7 Nm (62 lb·in), 6 Nm (53 lb·in), or even to about 5 Nm (44 lb·in). Higher torque limits (or none at all) are envisioned where filter capsules 200 using face seals are employed.

Regardless of the type of filter capsule 200 employed, provision of a torque limiter 138 on the filter compression adjustment 134 can provide further benefit to the operator by saving time and reducing the skill necessary to set-up a filter holder 100 to operate. For example, rather than having to incrementally tighten a filter capsule stack 250 and monitor compression force (perhaps via a gauge or load cell arrangement), an operator may simply adjust the filter compression adjustment 134 until the torque limiter 138 activates and further compressive force can no longer be applied to the filter capsule stack 250. Because this set up is so simple, the operator need not be trained on determining proper compression or reading gauge outputs.

Turning to FIG. 2, an operator is depicted standing in front of a filter holder 100 according to the present disclosure. The filter holder 100 shown comprises a holder arm 120 tiltable to a service position and an ergonomic loading position. As depicted, the filter arm 120 is tilted to the ergonomic loading position. As can be seen, the holder arm 120 is positioned at a comfortable height to allow the operator to load and unload filter capsule 200. More particularly, in the embodiment shown, the first distance A from the work surface W to the tilt axis 112 corresponds roughly to waist height for the operator. Typically, the first distance A is in a range from about 28 inches to about 40 inches, including, for example, each one-inch increment within that range. Placement of the holder arm 120 at such a comfortable height while in the ergonomic loading position can allow an operator to load and unload filter capsules 200 in an ergonomically efficient way, without, for example, bending down or having to reach over their heads.

As can be seen in FIG. 2, the front support bar 126 is positioned slightly below the tilt axis 112, and also below the holder arm axis 121. For example, the front support bar may be positioned in a range from about 1 inch to about 6 inches below the holder arm axis 121, including one-inch increments within that range. This lowered positioning of the front support bar 126 allows filter capsules 200, which will be aligned with the holder arm axis 121, to be loaded or unloaded from the holder arm 120 with less lifting—i.e., the lower the front support bar 126 with respect to the holder arm axis 121, the shorter the distance each filter capsule 200 must be lifted in order to pass over it.

Figure 9:
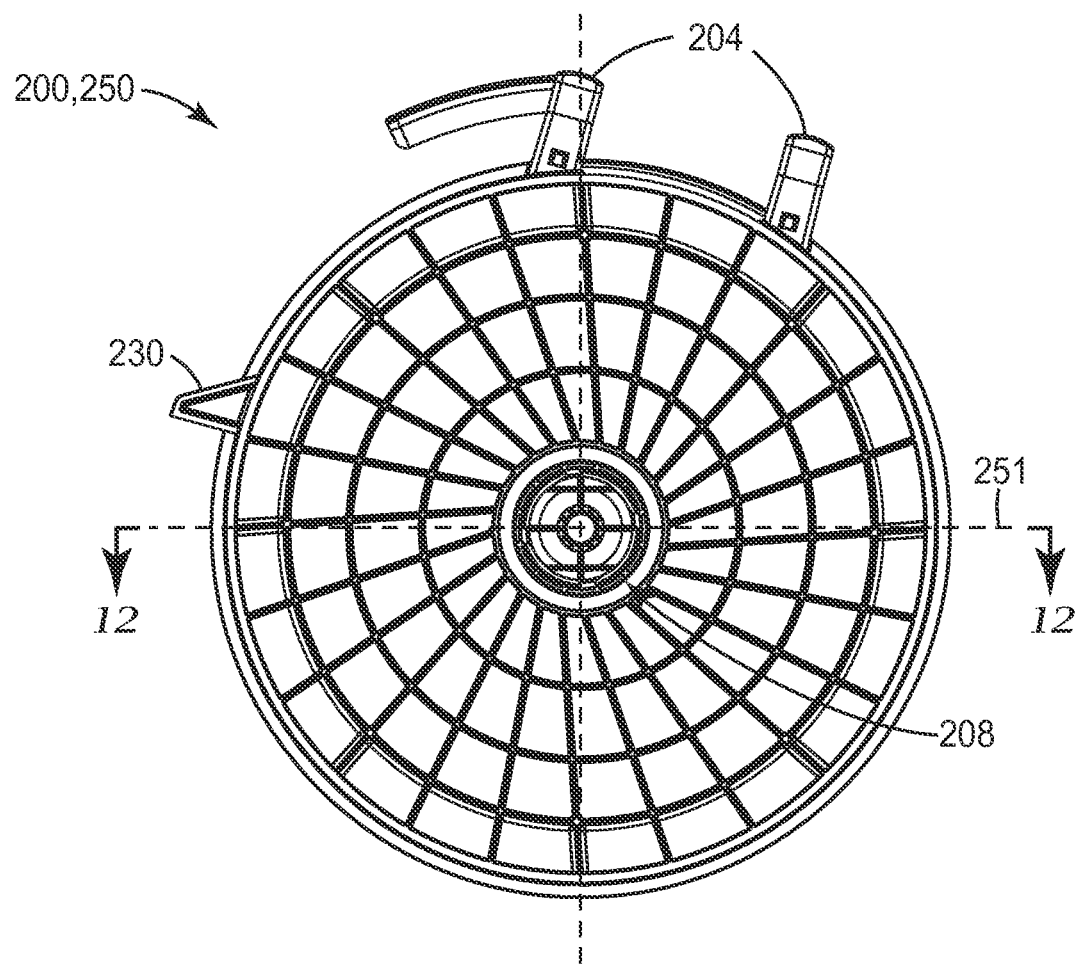
FIG. 9 is a top view of a filter capsule stack according to the present disclosure.

Moreover, in embodiments where the filter capsule 200 comprises a fulcrum lug 230, the filter capsule 200 can be rotated toward the operator until the fulcrum lug 230 contacts against the lowered front support bar 126. See, e.g., FIGS. 3 and 9. As rotation continues, contact between the fulcrum lug 230 and the front support bar 126 causes the filter capsule 200 to pivot about the front support bar 126, giving the operator a larger lever arm, and therefore increased mechanical advantage in installing and removing the filter capsule 200 from the holder arm 120. Because the holder arm 120 is positioned roughly at waist level, used filter capsules 200 may be conveniently rolled off of the holder arm 120 directly into a waste receptacle (not shown).

Figure 7:
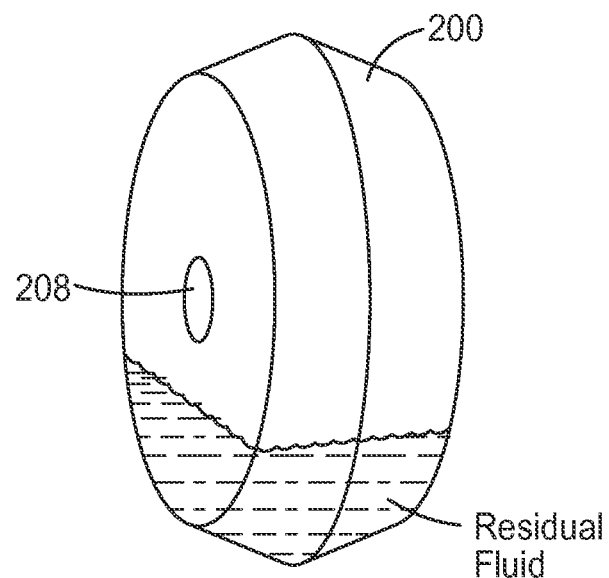
FIG. 7 is a perspective view of a filter capsule according to the present disclosure.

A further advantage of unloading of used filter capsules 200 while the holder arm 120 is in the ergonomic loading position is the containment of residual fluid in the used filter capsule 200. During operation, the interior of the filter capsules 200 becomes filled and saturated with fluid. Although efforts are made to minimize the amount of fluid entrained in each filter capsule 200 (i.e., lower hold-up volume; see, e.g., Cashin, page 13, line 22 through page 14, line 2), and further to remove excess fluid after use, some amount of residual fluid typically remains after operation. Thus, upon removal of each filter capsule 200 from the filter holder 100, there is a risk that residual fluid may leak through the exposed fluid ports of the filter capsule. As can be seen by comparison of FIGS. 7 and 8, removal of a filter capsule 200 while on its side (i.e., while the holder arm is in the ergonomic loading position) as in FIG. 7 is advantageous because residual fluid is contained within the filter capsule 200. In contrast, the filter capsule 200 unloaded in a vertical position as shown in FIG. 8 can leak residual fluid because the exposed fluid port is oriented on the bottom of the filter capsule 200.

As may also be seen in FIG. 2, the hand crank 114 on the tilting mechanism 110 is also placed at a convenient height for the operator, as are the holding plate 140, the locking bar 142, the compression plate 130 (not visible), and the filter compression adjustment 134 (not visible). Accordingly, in the embodiment shown, when the holder arm 120 is in the ergonomic loading position, all features that must be routinely accessed by the operator are positioned at a convenient, ergonomic height.

Figure 4:
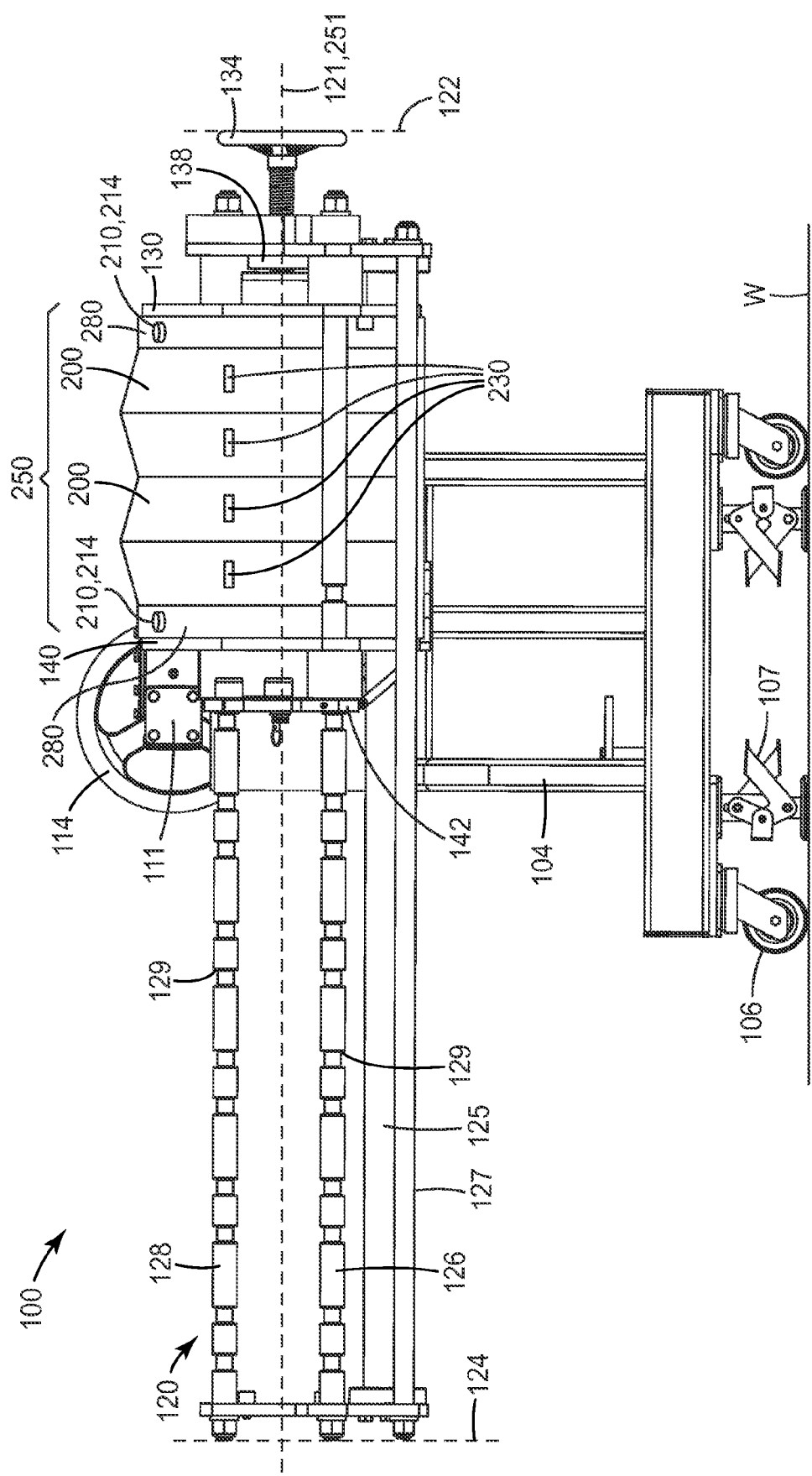
FIG. 4 is a front view of a filter holder according to the present disclosure with a holder arm in an ergonomic loading position wherein the holder arm comprises one or more filter capsules in a filter capsule stack.

FIG. 4 depicts a filter holder 100 in the ergonomic loading position wherein the holder arm 120 is loaded with a filter capsule stack 250 comprising two filter capsules 200 sandwiched between two manifold members 280. As shown the manifold members may optionally comprise one or more of a feed fluid ingress 210 or a filtrate egress 214. As can be seen, the filter capsule stack 250 is compressed between the compression plate 130 and the holding plate 140. Exemplary filter capsule stacks 250 can be seen, for example, in FIGS. 4, 10, and 11-12. It can also be clearly seen in the embodiment shown in FIGS. 2 and 4 that the front support bar 126 is positioned below the holder arm axis 121 to promote easier loading and unloading of filter capsules 200, as described above.

As shown in FIG. 4, the holding plate 140 has been positioned along front and rear support bars 126, 128 to contact the filter capsule stack 250, with the locking bar 142 shown engaged in a plate positioning groove 129 in the front support bar 126 to lock the holding plate 140 into position on the holder arm 120.

Figure 10:
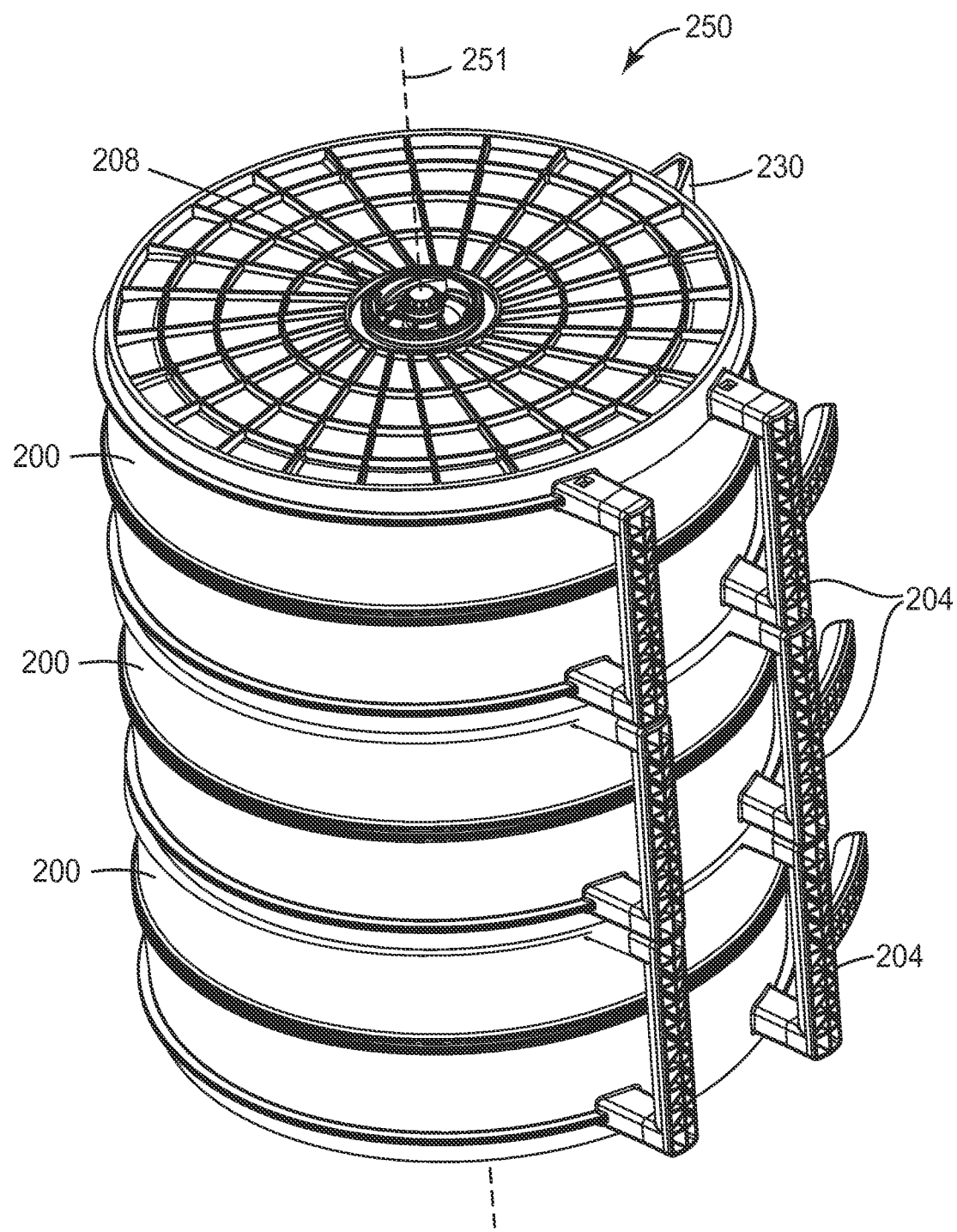
FIG. 10 is a perspective view of a filter capsule stack according to the present disclosure.

FIG. 10 depicts one embodiment of a filter capsule stack 250 according to the present disclosure. The filter capsule stack 250 depicted in FIG. 10 comprises three filter capsules 200 connected to one another by a fluid interconnect 208. While FIG. 10 depicts a fluid interconnect 208 that can advantageously employ a piston seal as described in Cashin, it is also envisioned that adjacent filter capsules 200 may fluidly connect to one another by way of a simple face seal, or a combination of piston seals and face seals. In embodiments where a face seal is employed, compression of the filter capsule stack 250 acts to engage and compress a face sealing member between filter capsules 200, thereby fluidly sealing each filter capsule 200 to an adjacent filter capsule 200.

Each filter capsule 200 can comprise one or more filter elements 202 disposed therein. In some embodiments, each filter capsule 200 comprises a different type of filter element 202. For example, each filter capsule 200 may comprise a filter element 202 for one of, for example, depth filtration, scale reduction, antimicrobial treatment, antiviral treatment, flavor enhancement, or others. Such filter elements 202 may be used alone or in combination with other filter elements 202. In this way, the filter capsule stack 250 may be customized to provide application-specific filtration.

Figure 12:
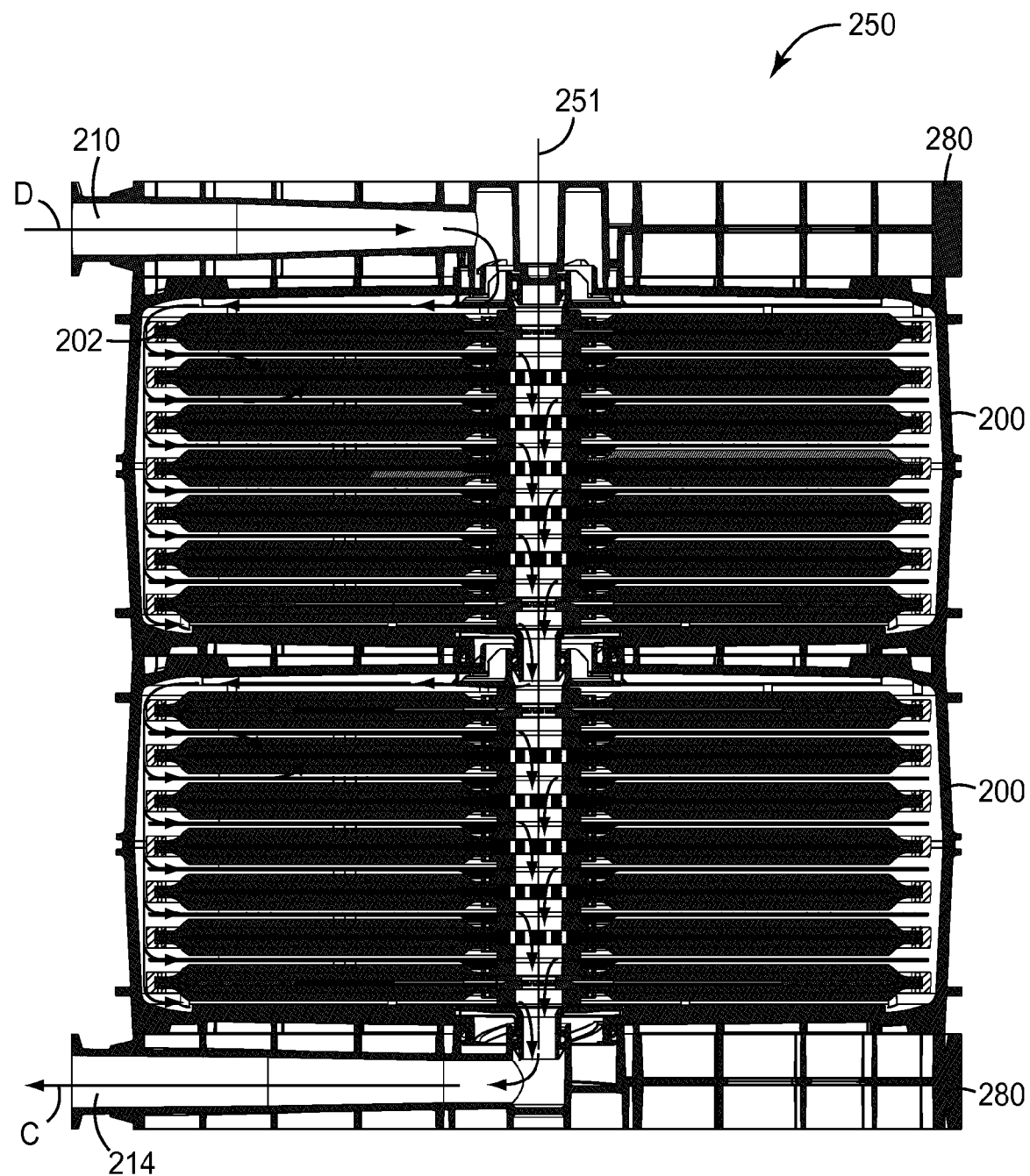
FIG. 12 is a cross-section view taken at 12-12 of FIG. 9 of a filter capsule stack according to the present disclosure.

In some applications, it may be desirable to provide a filter capsule stack 250 having either (i) both a feed fluid ingress 210 and a filtrate egress 214 located on a single end of the filter capsule stack 250, or (ii) a feed fluid ingress 210 on one end and a filtrate egress 214 on the opposing end. Locating a feed fluid ingress 210 and a filtrate egress 214 located on a single end allows associated plumbing to be located in a single area, rather than being separated by the length of the filter capsule stack 250. The result can be a more compact assembly. In some embodiments, the filter capsule stack 250 may comprise one or more manifold members 280, as depicted in FIG. 12. As shown in FIG. 12, "D" depicts a flow of dirty, or unfiltered, fluid into the feed fluid ingress 210, and "C" depicts a flow of clean, or filtered, fluid from the filtrate egress 214. The purpose of the manifold member 280, when employed, is to direct fluid flow at a terminal end of the filter capsule stack 250. The manifold member 280 can operate as a dead-end for filtrate, allowing the filtrate to reverse direction and travel back toward the filtrate egress 214 to exit the filter capsule stack 250. The manifold member 280 may also provide both fluid ingress 210 and filtrate egress 214 on a single end of the filter capsule stack 250. The manifold member 280 may, more simply, provide only feed fluid ingress 210 or only filtrate egress 214. Combinations of these embodiments are also envisioned. For example, flow configuration as described above may be utilized to achieve series or parallel filtration— e.g., one filter capsule 200 either in series or in parallel with an adjacent filter capsule 200. Such flow configurations may also be combined in a single filter capsule stack 250 so that certain filter capsules 200 are operated in parallel, while others are operated in series. The manifold member 280 may be constructed of, for example, polycarbonate or polypropylene.

As shown, FIG. 12 depicts a filter capsule stack 250 arranged such that dirty fluid "D" flows in through the top of the filter capsule stack and clean fluid "C" flows out through the bottom. However, it should be understood that such inlet and outlet flow may be configured in multiple ways. For example, in one embodiment, both feed fluid ingress 210 and filtrate egress 214 occur within a single manifold member 280 positioned at the bottom of the filter capsule stack 250, while only venting of excess gas occurs through a manifold member 280 positioned at the top of the filter capsule stack 250.

The filter capsule stack 250 is typically positioned in a holder arm 120 of a filter holder 100 during operation, as shown in FIG. 11. A holder arm 120 comprising a compression plate 130 and an opposing holder plate 140 may be required, for example, to hold the end walls of the outer-most located filter capsules 200 in a filter capsule stack 250. Because such outer-most located end walls are not supported against an adjacent filter capsule 200, contact with the compression plate 130 or the holder plate 140 can help to prevent wall flexure under internal fluid pressure. The filter holder 100 can apply force, along the direction of a first axis 251 of the filter capsule stack 250 (typically aligned with the holder arm axis 121), to the compression plate 130 and the holder plate 140.

Typically, the compression plate 130 and the holder plate 140 bear against a filter capsule 200 at one or the other end of the filter capsule stack 250. Typically, each filter capsule 200 in the filter capsule stack 250 contacts an adjacent filter capsule 200 at a bearing point, thus providing a known, rigid datum upon which to apply force. In some embodiments, the filter holder 100 may further provide apparatus for feed fluid ingress 210 and filtrate egress 214. In some embodiments, parts of the filter holder 100 may be constructed of, for example, stainless steel.

In a method of use, filter holders 100 according to the present disclosure are typically loaded with one or more filter capsules 200, optionally including one or more manifold members 280, to form a filter capsule stack 250 on the holder arm 120. The filter capsule stack 250 is compressed between a holding plate 140 and a compression plate 130. The filter holder is then operated as a filtration system in the service position.

In some embodiments, loading a filter capsule 200 onto the holder arm 120 comprises fitting an alignment wing 203 of a filter capsule against one of the front or rear support bars 126, 128 to align the first axis 251 of the filter capsule stack 250 with the holder arm axis 121.

In embodiments where the filter holder 100 comprises a holder arm 120 attached to a tilting mechanism at a tilt axis 112, the holder arm 120 is typically tilted to an ergonomic loading position and loaded with one or more filter capsules 200, optionally including one or more manifold members 280, to form a filter capsule stack 250 on the holder arm 120. The holder arm 120 is then tilted to a service position where the filter holder may be operated as a filtration system.

Typically, operating the filter holder as a filtration system comprises one or more of charging the filter capsule stack 250 with a fluid, purging the filter capsule stack 250 of excess gas, filtering the fluid through a filter capsule 200, and discharging residual fluid from the filter capsule stack 250.

In some embodiments, the filter arm 120 may be tilted by way of an operator turning a hand crank 114 coupled through a gear box 111 to a tilt shaft 113 at a tilt axis 112.

The method of operating the filter holder 100 may further comprise the filter capsule stack 250 being compressed between a holding plate 140 and a compression plate 130. In some embodiments, the holding plate is locked in place to prevent it from sliding. In one embodiment, locking is accomplished by a locking bar 142 that engages with a plate positioning groove 129 on one or more of the front and rear support bars 126, 128.

In one embodiment, the method further comprises adjusting the compression of the filter capsule stack 250 between the holding plate 140 and the compression plate 130. In some embodiments, this is done by an operator adjusting a filter compression adjustment 134. In one embodiment, the operator adjusts the filter compression adjustment 134 by increasing the compression of the filter capsule stack 250 until a torque limiter 138 activates to limit further compression. As described above, depending on the type and quantity of filter capsules 200 used in the filter capsule stack 250, the torque limit of the torque limiter 138 may be set to any appropriate torque, including an advantageous lower torque limit when filter capsules according to Cashin are employed.

In one embodiment, the method further comprises tilting the holder arm 120 from the service position back to the ergonomic loading position. Typically, tilting the holder arm 120 from the service position to the ergonomic loading position is done by reversing the steps described above for tilting the holder arm 120 into the service position.

The method may further comprise unloading the filter capsule stack 250 from the holder arm 120. When filter capsules 200 according to Cashin are employed, each filter capsule 200 is disengaged from an adjacent filter capsule 200 by holding the adjacent filter capsule 200 while rotating the filter capsule 200 to be removed toward the operator. In performing this step, very little lateral motion is required of the operator. Rather, the operator need only rotate the filter capsule 200 toward the operator's body and gently lift the filter capsule 200 out of the holder arm.

In some embodiments, unloading the filter capsule stack 250 from the holder arm 120 comprises rotating a filter capsule 200 over a front support bar 126. Where a fulcrum lug 230 is further provided on the filter capsule, rotating the filter capsule 200 over a front support bar 126 may comprise engaging the fulcrum lug 230 against the front support bar 126 and rotating the filter capsule 200 about the fulcrum lug 230 to roll the filter capsule 200 over the front support bar 126.

Where the filter capsule 200 further comprises a handle 204, the handle may be grasped by the operator to assist in rotating the filter capsule toward the operator, and also in holding the adjacent filter capsule 200 to prevent it from rotating while disengaging one filter capsule 200 from another. Handles 204 are clearly shown, for example, in FIGS. 9 and 10. Similarly the method may include grasping the handle 204 of a filter capsule 200 to lift the filter capsule 200 onto or off of the holder arm 120.

In one embodiment, the method includes tilting the holder arm 120 from a position where the center of gravity of the holder arm 120 is vertically misaligned from the tilt axis 112 into a position where the center of gravity of the holder arm 120 is substantially vertically aligned with the tilt axis 112.

Various modifications and alterations of the invention will be apparent to those skilled in the art without departing from the spirit and scope of the invention. It should be understood that the invention is not limited to illustrative embodiments set forth herein.

What is claimed is:

1. A filter holder comprising:
   a base for supporting the filter holder on a work surface;
   a tilting mechanism attached to the base; and
   a holder arm attached to the tilting mechanism at a tilt axis, the holder arm comprising:
   a base end, a continuously adjustable compression plate proximate the base end, a distal end, a holding plate proximate the distal end, a front support bar, and a rear support bar;
   the front support bar and the rear support bars extending from the base end to the distal end, the front support bar or the rear support bar comprising a plurality of plate positioning grooves distributed along its length, the holding plate incrementally movable to locations corresponding to the locations of the plate positioning grooves; and
   the holder arm being tiltable about the tilt axis to a service position and an ergonomic loading position.

2. The filter holder of claim 1 wherein the continuously adjustable compression plate is continuously adjustable by a filter compression adjustment that comprises a torque limiter.

3. The filter holder of claim 2 wherein the torque limit is less than about 12 N·m.

4. The filter holder of claim 1 wherein the tilt axis is located a first distance from the work surface and the base end of the holder arm is located a second distance from the tilt axis, the second distance being less than the first distance.

5. The filter holder of claim 4 wherein the compression plate is slidably connected to the front support bar and the rear support bar.

6. The filter holder of claim 1 wherein, when the holder arm is in the ergonomic loading position, the front support bar is positioned below the tilt axis, and the rear support bar is positioned at or above the tilt axis.

7. The filter holder of claim 1 wherein when in the service position, the holder arm is oriented orthogonal to the work surface, and when in the ergonomic loading position, the holder arm is oriented parallel to the work surface.

8. The filter holder of claim 1 wherein the tilt axis is located a first distance from the work surface, the first distance being in a range from about 28 inches to about 40 inches.

9. The filter holder of claim 1 wherein, when the holder arm is in the ergonomic loading position the center of gravity of the holder arm is not vertically aligned with the tilt axis, and, when the holder arm is in the service position, the center of gravity of the holder arm is substantially vertically aligned with the tilt axis.

10. The filter holder of claim 1 wherein the filter holder is mobile.

11. The filter of claim 10 wherein the base comprises one or more casters.

12. A filter system comprising the filter holder of claim 1 and a filter capsule stack loaded onto the holder arm.

13. The filter system of claim 12 wherein, when the holder arm is in the ergonomic loading position the center of gravity of the holder arm loaded with the filter capsule stack is not vertically aligned with the tilt axis, and, when the holder arm is in the service position, the center of gravity of the holder arm loaded with the filter capsule stack is substantially vertically aligned with the tilt axis.

14. A method of operating a filter holder comprising:
   tilting a holder arm to an ergonomic loading position;
   loading a filter capsule stack onto the holder arm; and
   tilting the holder arm about a tilt axis to a service position,
      wherein loading the filter capsule stack onto the holder arm comprises compressing the filter capsule stack between a compression plate and a holding plate.

15. The method of claim 14 wherein, when in the service position, the holder arm is in a vertical orientation, and when in the ergonomic loading position, the holder arm is in a horizontal orientation.

\* \* \* \* \*

UNITED STATES PATENT AND TRADEMARK OFFICE
CERTIFICATE OF CORRECTION

PATENT NO. : 9,242,193 B2
APPLICATION NO. : 13/504161
DATED : January 26, 2016
INVENTOR(S) : Deborah Bryan Page 1 of 1

It is certified that error appears in the above-identified patent and that said Letters Patent is hereby corrected as shown below:

Specification

Column 11
Line 60, delete "16 Nm" and insert -- 16 N·m --, therefor.
Line 60, delete "15 Nm" and insert -- 15 N·m --, therefor.
Line 61, delete "Nm" and insert -- N·m --, therefor.
Line 61, delete "13 Nm" and insert -- 13 N·m --, therefor.
Line 61, delete "12 Nm" and insert -- 12 N·m --, therefor.
Line 61, delete "11 Nm" and insert -- 11 N·m --, therefor.
Line 62, delete "10 Nm" and insert -- 10 N·m --, therefor.
Line 62, delete "9 Nm" and insert -- 9 N·m --, therefor.
Line 62, delete "8 Nm" and insert -- 8 N·m --, therefor.
Line 63, delete "7 Nm" and insert -- 7 N·m --, therefor.
Line 63, delete "6 Nm" and insert -- 6 N·m --, therefor.
Line 63, delete "5 Nm" and insert -- 5 N·m --, therefor.

Signed and Sealed this
Twenty-eighth Day of June, 2016

Michelle K. Lee
*Director of the United States Patent and Trademark Office*